(12) United States Patent
Kawaguchi et al.

(10) Patent No.: US 7,184,884 B2
(45) Date of Patent: Feb. 27, 2007

(54) NAVIGATION DEVICE, INFORMATION SUPPLYING SERVER AND INFORMATION SERVICE SYSTEM USING THE SAME

(75) Inventors: Kenichi Kawaguchi, Tokyo (JP); Yuichiro Ichiyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 274 days.

(21) Appl. No.: 10/800,864

(22) Filed: Mar. 16, 2004

(65) Prior Publication Data
US 2004/0204826 A1    Oct. 14, 2004

(30) Foreign Application Priority Data
Apr. 8, 2003    (JP)    ............................. 2003-104305

(51) Int. Cl.
*G05D 21/00*    (2006.01)
(52) U.S. Cl. .................... 701/201; 701/25; 701/207; 701/208; 701/211; 340/990; 340/995.23
(58) Field of Classification Search .................. 701/23, 701/25, 200, 201, 207, 208, 211, 300; 340/988, 340/990, 995.23
See application file for complete search history.

(56) References Cited

U.S. PATENT DOCUMENTS

| | | | |
|---|---|---|---|
| 5,887,269 A * | 3/1999 | Brunts et al. ............... | 701/208 |
| 2002/0083065 A1* | 6/2002 | Sasaki et al. ............... | 707/100 |
| 2002/0103781 A1* | 8/2002 | Mori et al. .................... | 707/1 |
| 2003/0004888 A1* | 1/2003 | Kambayashi et al. ......... | 705/59 |

FOREIGN PATENT DOCUMENTS

JP    2000-321082 A    11/2000

* cited by examiner

*Primary Examiner*—Gertrude A. Jeanglaude
(74) *Attorney, Agent, or Firm*—Birch, Stewart, Kolasch & Birch, LLP

(57) ABSTRACT

A navigation device in that on each of fixed information having a long update period and update information having a short update period which compose the user service information stored in a navigation device whether or not the user service information is newest, is determined, and the newest information corresponding to at least one of the fixed information and the update information which are determined to be not newest by the determination is acquired from an information supply server, thus, in almost all cases, only the update information is acquired from the information supply server, so it acquires the desired user service information in a short time, and therefore, low communication expenses.

7 Claims, 5 Drawing Sheets

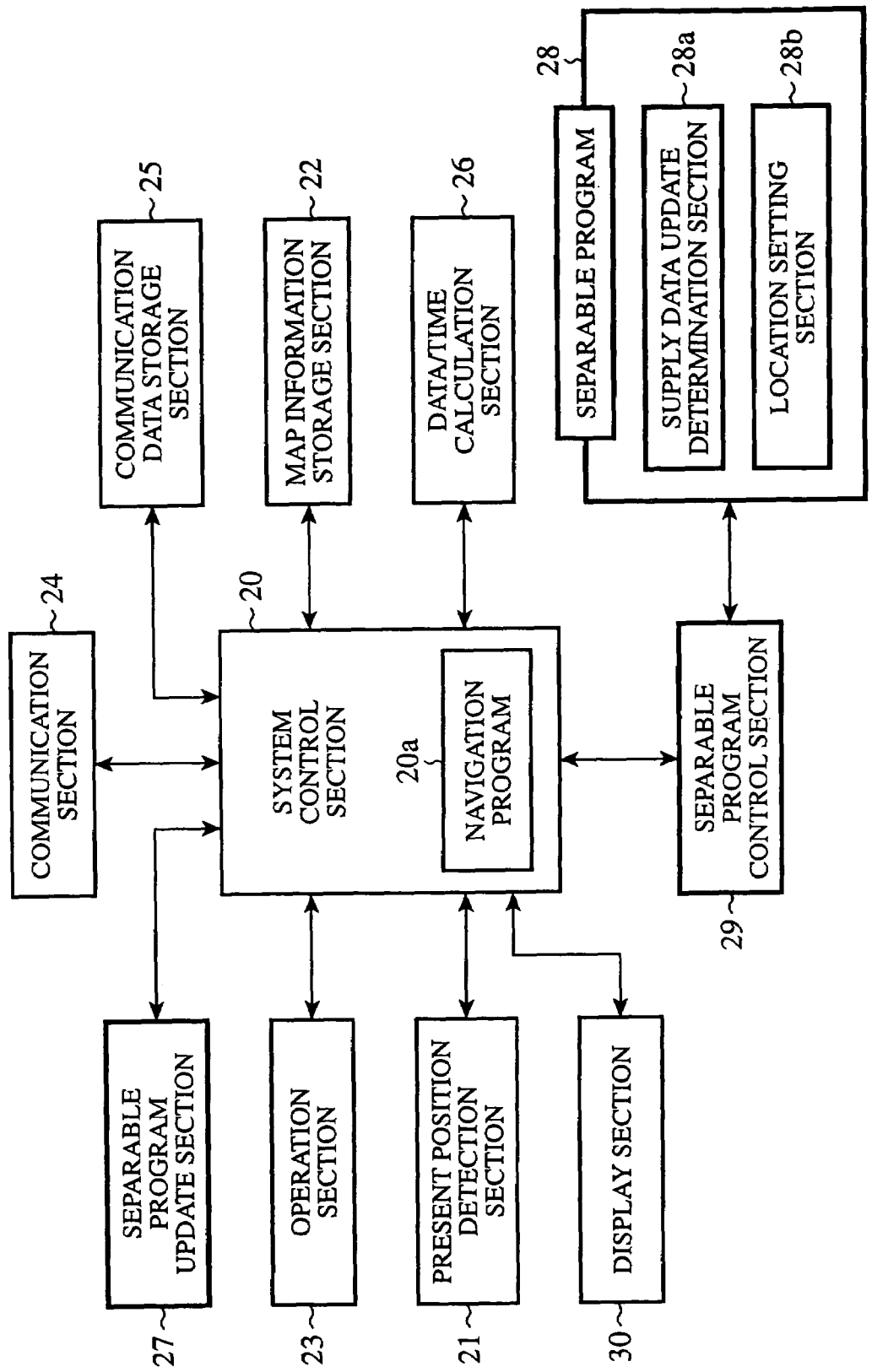

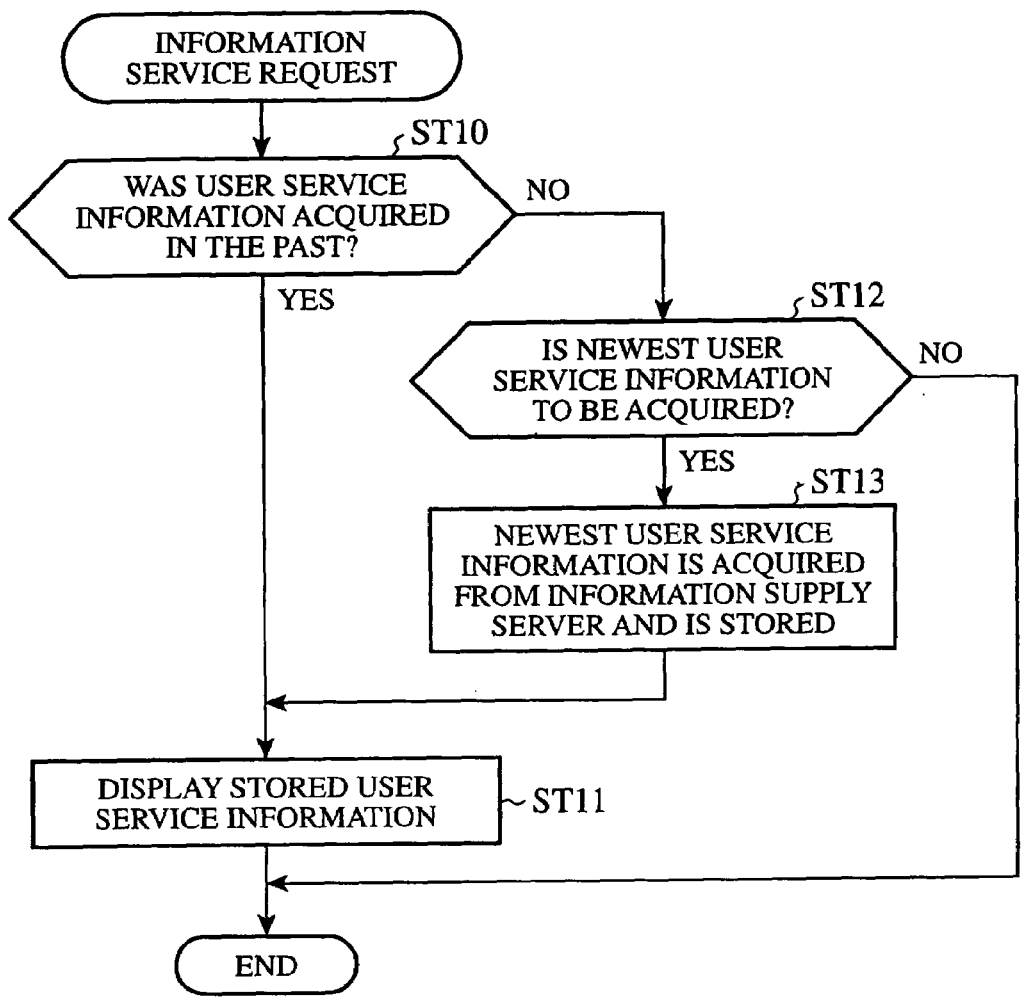
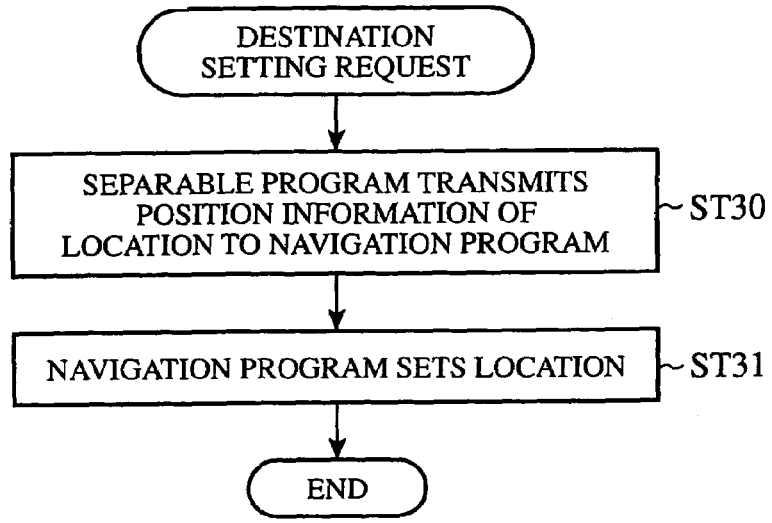

NAVIGATION DEVICE, INFORMATION SUPPLYING SERVER AND INFORMATION SERVICE SYSTEM USING THE SAME

BACKGROUND OF THE INVENTION

1. Field of the Invention

The present invention relates to a navigation device, an information supply server and an information service system using the same, and in particular to a technology for supplying the newest information to users with efficiency.

2. Description of the Related Art

A navigation device for supplying the guidance information of sightseeing area, for example, in response to the operation of a user has been proposed in the conventional art. For such a navigation device it is requested to guide states and information fit for user's tastes and preferences. As a device responding to such a request has been known a map display device that is capable of displaying actual operating conditions of the facility in a state where the user can make a check on the services at the time of displaying a facility on a map (for example, see patent document 1).

This map display device makes a request of supplying facility information to an information service center at the timing of a user's request occurring randomly or at the automatic update timing occurring automatically every predetermined time and acquires the facility information. The facility information acquired in this manner is updated and stored then the facility is displayed by the use of the facility information thus updated and stored. At this time, the facility is displayed while indicating whether it is in operation or not. In other words, at the time of displaying a facility mark showing a selected facility, it is determined whether the selected facility is in operation or not based on the date and time of selection then the facility mark is displayed in a state where a person can decide whether the selected facility is in operation or not. For example, highlighted display or blinking display is employed only for the facilities in operation.

[Patent document 1] Japanese Unexamined Patent Publication No. 2000-321082

The map display device disclosed in the patent document 1 described above acquires facility information from the information service center in one lump manner and the business hours of the selected facilities included in the facility information thus acquired are displayed in a state where the user can decide whether the facilities are in operation or not. Hence, in order to acquire the facility information, it is necessary that a large amount of data are received from the information service center. Therefore, this presents a problem of elongating time of communication need to acquire all the facility information and at the same time a problem of increasing communication cost.

At this point, a kind of the information desired by users is different among the users respectively, thereby an advance preparation of information display program capable of displaying the information of all kinds desired by the users needs a large amount of memory and hence it is out of reality. Moreover, the information display program needs to be updated in some cases, for example, because of adding new functions and the like. In these cases, downloading a navigation program and the information display program at the same time for each update takes much time and incurs many communication expenses. Therefore, there has been requested a function capable of updating the information display program with ease.

SUMMARY OF THE INVENTION

The present invention has been made to solve the above mentioned problems and to respond to the above mentioned request. It is the object of the present invention to provide a navigation device and an information supply server that can acquire desired information in a short time and at low communication expenses and can update a program for displaying the information with ease and to provide an information service system using the navigation device and the information supply server.

A navigation device in accordance with the present invention has a storage part that stores user service information including fixed information which is updated at intervals of a predetermined period and update information which is updated at intervals of a period shorter than the predetermined period; and operation means that provides an instruction of displaying the user service information. Then, in response to the instruction which is provided by the operation means, the navigation device determines on each of the fixed information and the update information whether or not the user service information stored in the storage part is the newest; and acquires, from an information supply server, the newest information corresponding to at least one of the fixed information and the update information which are determined to be not the newest by the determination means. Then, the navigation device updates the user service information in the storage part by use of at least one of the newest fixed information and the newest update information which are acquired; and displays the updated user service information in the storage part.

An information supply server in accordance with the present invention includes a storage part that stores the user service information including the fixed information which is updated at intervals of a predetermined period and the update information which is updated at intervals of a period shorter than the predetermined period; and a communication device that transmits, in response to a request from a navigation device, at least one of the fixed information and the update information which are stored in the storage part.

An information service system in accordance with the present invention is composed with the above mentioned navigation device in accordance with the present invention, and the above mentioned information supply server in accordance with the present invention, which are connected through a network.

As described above, according to the present invention, it is provided a navigation device, an information supply server and an information service system in that on each of the fixed information having a long update period and the update information having a short update period which compose the user service information stored in the navigation device whether or not the user service information is the newest, is determined, and the newest information corresponding to at least one of the fixed information and the update information which are determined to be not the newest by this determination is acquired from the information supply server. Therefore, in almost all cases, only the update information is acquired from the information supply server, so there is provided an advantage of acquiring the desired user service information in a short time and at low communication expenses.

BRIEF DESCRIPTION OF THE DRAWINGS

FIG. 4 is a functional block diagram to show the functional configuration of a navigation electronic control unit (ECU) shown in FIG. 2.

FIG. 5 is a flow chart to show a process in a++ supply information update determination section of a separable program shown in FIG. 4.

FIG. 7 is a flow chart to show a process in a location setting section of the separable program shown in FIG. 4.

DETAILED DESCRIPTION OF THE PREFERRED EMBODIMENTS

Hereinafter, the preferred embodiments of the present invention will be described in detail with reference to the accompanied drawings.

Embodiment 1

Figure 1:
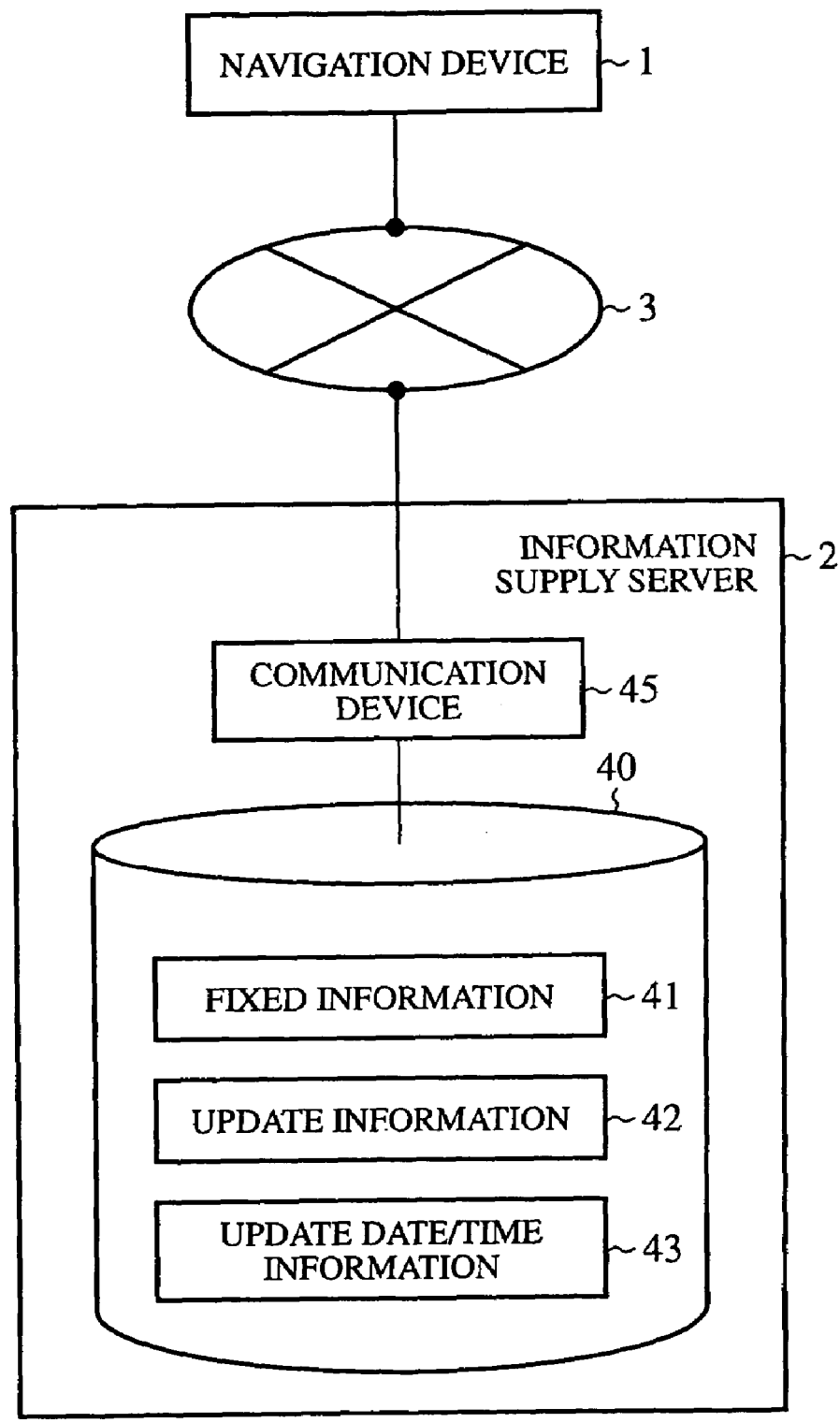
FIG. 1 is a block diagram to show the configuration of an information service system in accordance with embodiment 1 of the present invention.

FIG. 1 is a block diagram to show the configuration of an information service system in accordance with embodiment 1 of the present invention. This information service system, as shown in FIG. 1, is composed with a navigation device 1 which is mounted in a vehicle, an information supply server 2 and an internet 3 by which the navigation device 1 and the information supply server 2 are connected with.

(1) Information supply server

The information supply server 2 is composed with a storage device 40 and a communication device 45. The storage device 40 corresponds to a second storage part of the present invention and stores user service information to be supplied to user. In this embodiment 1, the user service information is supposed to include ski area information, blooming information and autumn colors information.

Each of the ski area information, the blooming information and the autumn colors information which compose the user service information include fixed information 41, update information 42 and update date/time information 43. The fixed information 41 is updated at intervals of a long predetermined period, for example, every year. On the other hand, the update information 42 is updated at intervals of a period shorter than the predetermined period of updating the fixed information 41, for example, in real time. The update data/time information 43 includes information representing date and time when the fixed information 41 or the update information 42 are updated.

The fixed information 41 of ski area information is composed with the fixed information such as locations of ski areas, facilities provided in each location, and operating hours of each facility. The update information 42 of ski area information is composed with current information which varies every moment such as amount of snow cover, weather, and sliding conditions of the ski area.

Then, the fixed information 41 of blooming information is composed with the fixed information such as locations of flowering, facilities provided in each location, and operating hours of each facility. The update information 42 of blooming information is composed with current information which varies every moment such as degree of blooming and weather.

And also, the fixed information 41 of autumn colors information is composed with the fixed information such as locations where trees turn red, facilities provided in each location, and operating hours of each facility. The update information 42 of autumn colors is composed with current information which varies every moment such as degree of autumn colors and weather.

The communication device 45 reads user service information from the storage device 40 in response to an information acquisition request transmitted through the internet 3 from the navigation device 1 and transmits the user service information to the navigation device 1 through the internet 3. The information acquisition request from the navigation device 1 is made independently to each of the fixed information 41 and the update information 42. Once the navigation device 1 acquires the fixed information 41, it hardly needs to update the fixed information 41 and hence in many cases, it makes a request of acquiring only for the update information 42.

(2) Navigation device

Figure 2:
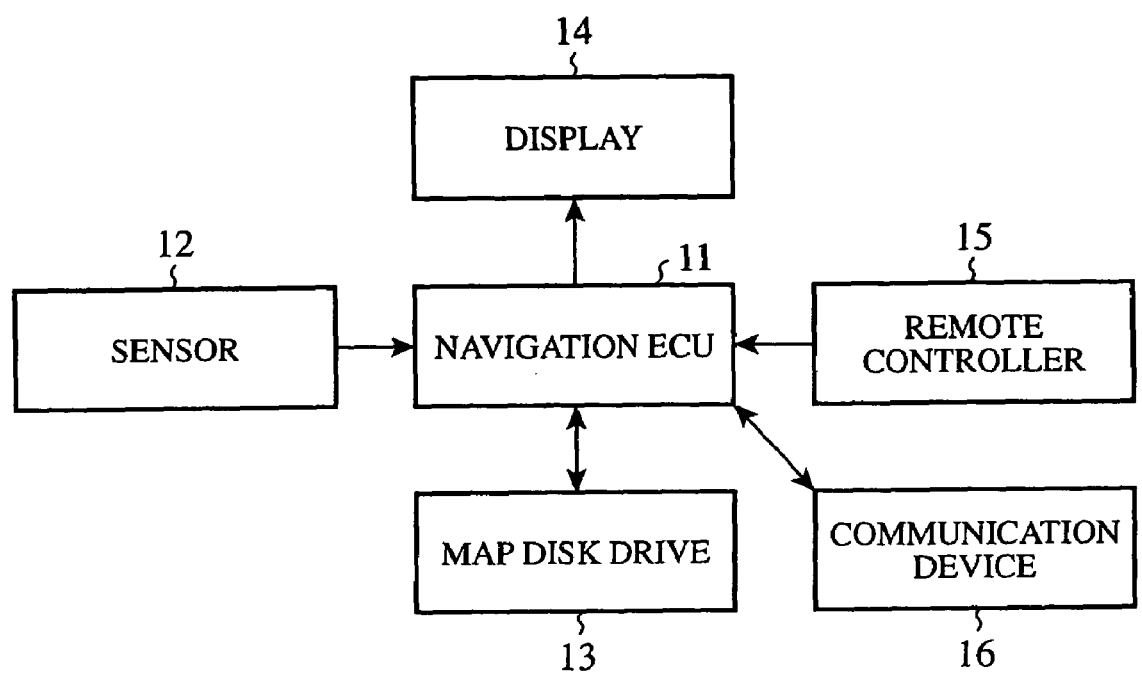
FIG. 2 is a block diagram to show the schematic configuration of a navigation device shown in FIG. 1.

FIG. 2 is a block diagram to show the schematic configuration of the navigation device 1. This navigation device 1 is composed with a navigation electronic control unit (hereinafter refereed to as "navigation ECU") 11, a sensor 12, a map disk drive 13, a display 14, a remote controller 15, and a communication device 16.

The navigation ECU 11 is composed with, for example, a microcomputer and controls the whole navigation device 1. The detailed structure and operation of this navigation ECU 11 will be described later in detail.

The sensor 12 is composed with, for example, a GPS (Global Positioning System) receiver, a direction sensor, a vehicle speed sensor (all of them not shown) and the like. The GPS receiver receives electromagnetic waves from a GPS satellite and detects the present position of a vehicle and outputs position data. The direction sensor is composed with, for example, a gyroscope and detects a traveling direction of the vehicle and outputs direction data. The vehicle speed sensor detects a vehicle speed and outputs speed data. The position data, the direction data and the speed data that are outputted respectively from the GPS receiver, the direction sensor and the vehicle speed sensor are transmitted as sensor data to the navigation ECU 11.

The map disk drive 13 is composed with, for example, a hard disk drive (HDD) and stores map data. The map data is used for displaying a map on the display 14 and for checking the present position of the vehicle on the basis of sensor data supplied from the sensor 12. The map data read from the map disk drive 13 is transmitted to the navigation ECU 11. At this point, the map disk drive 13 can be composed with not only the hard disk but also a drive device for driving a CD-ROM, a DVD-ROM, and other recording media.

The display 14 displays a guiding route, a vehicle position mark, a facility mark, and the like in overlapping manner on the map around the vehicle on the basis of the map data transmitted from the navigation ECU 11. At the same time, the display 14 is used for displaying the user service information such as ski area information, blooming information and autumn colors information.

The remote controller 15 is used for users to operate the navigation device 1. At this point, a joystick, a touch switch displayed over the screen of display 14, a mechanical switch arranged around the display 14 or a combination of them can be used in place of the remote controller 15. A signal produced by operation of this remote controller 15 is transmitted to the navigation ECU 11.

The communication device 16 is used for connecting the navigation ECU 11 to the information supply server 2 through the internet 3 and for controlling transmission and reception of data between the navigation device 1 and the information supply server 2. In this communication device 16, for example, HTTP (Hyper Text Transfer Protocol) is used as a communication protocol.

Figure 3:
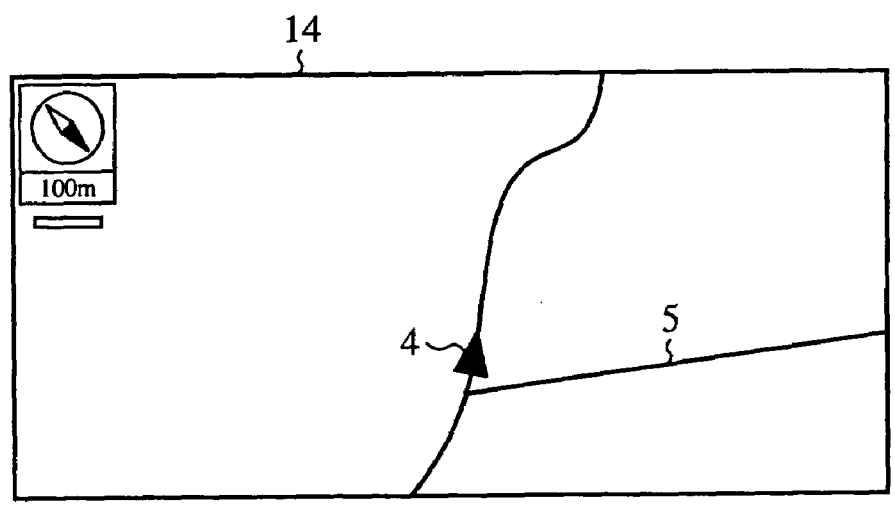
FIG. 3 is an illustration to show an example of a screen displayed by the navigation device shown in FIG. 1.

In a case where the navigation device 1 constructed in the above described manner performs ordinary navigation, the navigation ECU 11, as shown in FIG. 3, receives sensor data from the sensor 12 and calculates the present position of the vehicle and displays, on the display 14, a mark 4 which shows the present position of the vehicle over a map 5 prepared on the basis of the map data read from the map disk drive 13.

Next, the functional configuration of navigation ECU 11 will be described with reference to a functional block diagram shown in FIG. 4. This navigation ECU 11 is composed with a system control section 20, a present position detection section 21, a map information storage section 22, an operation section 23, a communication section 24, a communication data storage section 25, a data/time calculation section 26, a separable program update section 27, a separable program 28, a separable program control section 29, and a display section 30. These constituent elements are realized by a processing performed by a microcomputer composing the navigation ECU 11. At this point, the system control section 20, the operation section 23, the communication section 24, the communication data storage section 25, the separable program 28, the separable program control section 29, and the display section 30 composes an information service means of the present invention.

The system control section 20 controls the whole navigation ECU 11. The system control section 20 includes a navigation program 20*a*. The navigation program 20*a* corresponds to the navigation means of the present invention and performs a processing for realizing well known navigation functions such as setting locations of destinations and locations on the way to destinations, searching a guiding route to the set locations or a guiding route passing though the set locations, and guidance in accordance with the searched guiding route.

The present position detection section 21 detects the present position of the vehicle on which the navigation device 1 is mounted on the basis of sensor data form the sensor 12 and transmits it as the present position data of the vehicle to the system control section 20. The navigation program 20*a* included in the system control section 20 determines the present position on the map of the vehicle by checking the present position data from the present position detection section 21 against map data read from the map information storage section 22.

The map information storage section 22 corresponds to the map disk drive 13. The map information storage section 22 reads map data from the map disk drive 13 in response to a request from the system control section 20 and transmits it to the system control section 20.

The operation section 23 produces an operation instruction on the basis of a signal transmitted from the remote controller 15 and transmits it to the system control section 20.

The communication section 24 controls the communication device 16 to control communication between the navigation device 1 and the information supply server 2 connected through the internet 3 to the navigation device 1 or the other server on the internet 3.

The communication data storage section 25 corresponds to the first storage part of the present invention and stores user service information acquired from the information supply server 2 through the communication section 24 and the internet 3. The user service information stored in the communication data storage section 25 is the same as the user service information stored in the storage device 40 of the information supply server 2 and is composed with the fixed information 41, the update information 42, and the update date/time information 43. The user service information stored in the communication storage section 25 is referred to by the separable program 28 by way of the system control section 20 and the separable program control section 29.

The date/time calculation section 26 calculates the present date, day of the week and time on the basis of GPS information acquired from the GPS receiver included in the sensor 12 and transmits them to the system control section 20.

The separable program update section 27 acquires the separable program 28 from a server (which is not always the information supply server 2) on the internet 3. Only by the separable program update section 27, the separable program 28 can be updated independently of the navigation program 20*a* which is included in the system control section 20. Hence, in a case where the separable program 28 is updated because of adding new functions or the like, only the separable program 28 can be downloaded from the server 2, so that time and communication expenses involved in downloading can be saved.

The separable program 28 is a program for acquiring the user service information from the information supply server 2 and storing it in the communication data storage section 25. The separable program 28 is composed with a supply information update determination section 28*a* and a location setting section 28*b*. The determination means and update means of the present invention are composed with the supply information update determination section 28*a*.

The supply information update determination section 28*a* determines whether or not the user service information stored in the communication data storage section 25 is required to be updated and if required, updates the user service information. In a case where a location included in the user service information, for example, a ski area is to be searched, the location setting section 28*b* transmits an instruction to the effect that the location of the ski area is set as a destination or a location on the way to a destination to the navigation program 20*a* via the separable program control section 29.

The separable program control section 29 controls transmission and reception of data between the system control section 20 and the separable program 28.

The display section 30 converts map data and user service information transmitted from the system control section 20 in a format to be displayed and transmits it to the display 14. In this manner, the map and the user service information are displayed on the display 14.

Figure 6:
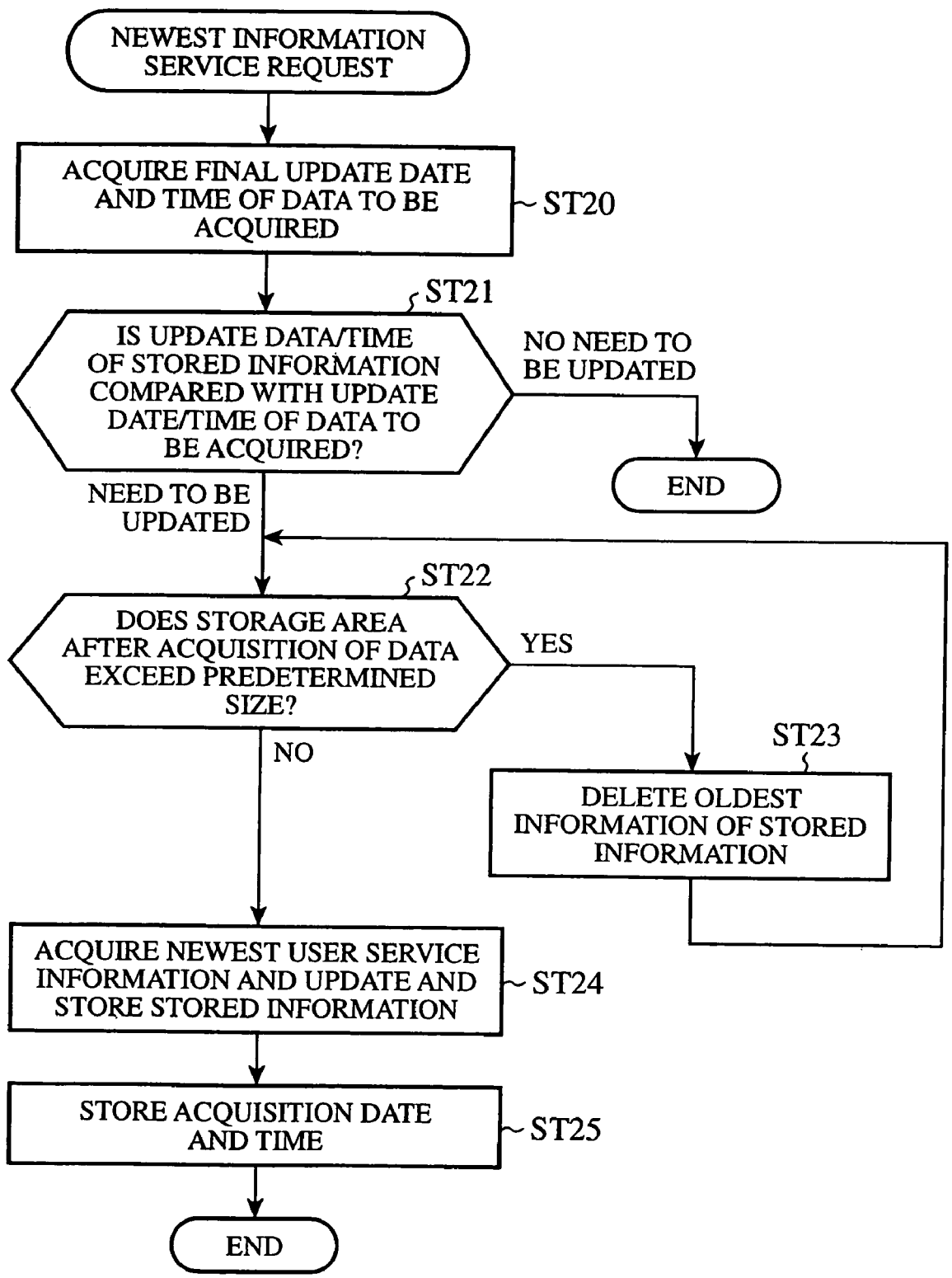
FIG. 6 is a flow chart to show a process of acquiring the newest user service information from an information supply server shown in FIG. 5 and storing the user service information.

Next, operation of the navigation device 1 constructed in the above described manner will be described with particular emphasis on an operation of updating user service information stored in the communication data storage section 25 with the newest information with reference to flow charts shown in FIG. 5 to FIG. 7.

First, when the remote controller 15 is operated and the operation section 23 makes a request to the system control section 20 for display of user service information, the system control section 20 transmits a display request to that effect to the separable program 28 by way of the separable program control section 29. The separable program 28 starts a processing of displaying the user service information in response to this display request.

That is, the separable program 28, as shown in a flow chart in FIG. 5, first, determines whether or not the user service information (user service information related to the display request) was acquired in the past (step ST10). To be specific, the separable program 28 determines whether or not the user service information related to the display request is stored in the communication data storage section 25 by way of the separable program control section 29 and the system control section 20. In this respect, in order to avoid complicated description, in the following will be omitted description to the effect that transmission and reception of data between the separable program 28 and the respective constituent sections connected to the system control section 20 are performed by way of the separable program control section 29 and the system control section 20.

If it is determined in this step ST10 that the user service information was acquired in the past, next, the stored user service information is displayed (step ST11). That is, the separable program 28 reads the user service information related to the display request from the communication data storage section 25 and transmits it to the display section 30. In this manner, a character string and a figure based on the user service information already stored in the communication data storage section 25 are displayed on the display 14. Then, the processing of separable program 28 is finished.

If in a case it is determined in the above step ST10 that the user service information was not acquired in the past, next, it is determined whether or not the newest user service information is to be acquired (step ST12). That is, the separable program 28 displays, on the display 14, a message asking whether or not the newest user service information is to be acquired. When the user responds to this message and gives the operation section 23 a direction to the effect that the newest user service information is not to be acquired, the processing of separable program 28 is finished without displaying user service information on the display 14.

If the user responds to the message displayed on the display 14 in the above step ST 12 and gives the operation section 23 a direction to the effect that the newest user service information is to be acquired, a processing of acquiring and storing the newest user service information from the information supply server 2 is executed (step ST13). The processing performed in this step ST 13 is executed by the supply information update determination section 28a. The detail of the processing performed by the supply information update determination section 28a will be described with reference to a flow chart shown in FIG. 6.

In the processing performed by the supply information update determination section 28a, first, the final update date and time of data to be acquired are acquired (step ST20). Specifically, the separable program 28 acquires update date/time information 43 from the information supply server 2 through the communication section 24 and the internet 3.

Next, stored update date and time are compared with update date and time of data to be acquired (step ST21). That is, the separable program 28 determines whether or not the update date and time of fixed information and the update date and time of update information shown by the update date and time information stored in the communication data storage section 25 are equal to the update date and time of fixed information 41 and the update date and time of update information 42 shown by the update date/time information 43 acquired in step ST20, respectively.

If it is determined in this step ST21 that they are equal to each other, it is recognized that update is not required and the processing of separable program 28 is finished. On the other hand, if it is determined that they are not equal to each other, next, it is determined whether or not a storage area after acquisition of the data exceeds a predetermined size (step ST22). That is, the separable program 28 determines whether or not the fixed information 41 and/or the update information 42 read from the information supply server 2 can be stored in the communication data storage section 25.

If it is determined in this step ST22 that the storage area after acquisition of the data exceeds the predetermined size, the oldest information of the stored information is deleted (step ST23). To be specific, in a case where the fixed information 41 from the information supply server 2 is stored in the communication data storage section 25, the fixed information having the oldest update date and time in the communication data storage section 25 is deleted. Then, in a case where the update information 42 from the information supply server 2 is stored in the communication data storage section 25, the update information having the oldest update date and time in the communication data storage section 25 is deleted. Thereafter, the sequence returns to step ST22 and then the processing in steps ST22 and ST23 are repeatedly executed.

In the process of repeated executing of the processing in steps ST22 and ST23, when it is determined in step ST22 that the storage area after acquisition of the data does not exceed the predetermined size, next, the newest user service information is acquired and stored information is updated and stored (step ST24). Specifically, the separable program 28 downloads the newest user service information through the internet 3 from the information supply server 2 and stores it in the communication data storage section 25. At this time, the fixed information 41 stored in the storage device 40 of the information supply server 2 is updated at long intervals, for example, every year, so that in many cases only the update information 42 is downloaded from the information supply server 2. Hence, it is possible to shorten the time involved in downloading and to reduce communication cost as compared with a conventional case where both of the fixed information 41 and the update information 42 are always downloaded at the same time.

Next, acquisition date and time are stored (step ST25). To be specific, the separable program 28 reads the present date, day of the week and time from the date/time calculation section 26 and stores them in the communication data storage section 25 in correspondence with the updated fixed information and/or update information. In this manner, it is possible to identify the update date of the respective fixed information or update information stored in the communication data storage section 25. Thereafter, the processing of separable program 28 is finished.

Next, the detail of a processing performed by the location setting section 28b will be described with reference to a flow chart shown in FIG. 7.

When the operation section 23 makes a request to the system control section 20 for setting a location in a state where desired user service information is displayed on the display 14, the system control section 20 transmits the request of setting a location through the separable program control section 29 to the separable program 28. Thereby, the location setting section 28b is started.

When the location setting section 28b is started, the separable program 28 transmits the position information of a location specified by the user service information displayed on the display 14 to the navigation program 20a of the system control section 20 (step ST30).

When the navigation program 20a receives the position information from the location setting section 28b, it sets a location, just as with a case where the navigation program 20a receives the position information showing a destination and locations on the way to the destination from the operation section 23. Thereafter, although not described in detail, the navigation program 20a performs a processing for realizing well-known navigation functions such as search for a guiding route to the set location or a guiding route passing the set location and guidance according to the searched guiding route.

According to the structure described above, the navigation function is operated only by making a request of setting a location in a state where the desired user service information is displayed, by which a guidance to the location is performed. Hence, the user can omit a troublesome operation of setting a destination and locations on the way to the destination in a state where the destination and locations on the way to the destination are to be set after a state where the user service information is once displayed. Therefore, this offers an advantage of enhancing operability.

As described above, according to this embodiment 1, navigation device and information service system are provided in that the communication data storage section 25 for storing the user service information including the fixed information which is updated at long intervals and the update information which is updated at short intervals in real time and the operation section 23 for providing an instruction of displaying the user service information are included. Then, in response to the instruction from the operation section 23, navigation device in the system is determined on each of the fixed information and the update information whether or not the user service information stored in the communication data storage section 25 is the newest, and the newest information corresponding to at least one of the fixed information and the update information which are determined to be not the newest by this determination is acquired from the information supply server 2. Then, the user service information stored in the communication data storage section 25 is updated by the use of at least one of the acquired newest fixed information and update information and this updated user service information in the communication data storage section 25 is displayed by the display section 30. Therefore, in a case where the newest information is acquired from the information supply server 2, in almost all cases, only the update information is acquired, so that desired user service information can be acquired in a short time and at low communication expenses.

What is claimed is:

1. A navigation device for making guidance to a set destination, the navigation device including an information service device for supplying a user with information, the information service device comprising:

a storage part that stores user service information including fixed information which is updated at intervals of a predetermined period and update information which is updated at intervals of a period shorter than the predetermined period;

an operation device that provides an instruction of displaying the user service information;

a determination device that determines, in response to the instruction provided by the operation device, on each of the fixed information and the update information whether or not the user service information stored in the storage part is the newest;

a communications device that acquires, from outside, newest information corresponding to at least one of the fixed information and the update information which are determined to be not the newest by the determination device;

an update device that updates the user service information in the storage part by use of at least one of the fixed information and the update information which are acquired by the communication device; and a display that displays the user service information in the storage part updated by the update device.

2. The navigation device as claimed in claim 1, wherein the information service device further comprises a location setting device that transmits position information of a location which is displayed on the display device to the navigation device in response to an instruction of setting a location that is provided by the operation device, and the navigation device sets a location on the basis of the position information transmitted by the location setting device and makes a guidance to the set location.

3. The navigation device as claimed in claim 1, wherein the information service device includes a separable program capable of being separated from a navigation program of a computer program composing the navigation device and the separable program is updated independently of the navigation program.

4. The navigation device as claimed in claim 1, wherein the update information is composed of at least any one of ski area information including snow cover, weather and sliding conditions, blooming information, and autumn colors information including kinds of trees, degree of autumn colors and weather.

5. An information service system comprising a navigation device for making guidance to a set destination, and an information supply server, which are connected through a network, wherein the navigation device includes an information service device for supplying a user with information and the information service device has:

a first storage part that stores user service information including fixed information which is updated at intervals of a predetermined period and update information which is updated at intervals of a period shorter than the predetermined period;

an operation device that provides an instruction of displaying the user service information;

a determination device that determines, in response to the instruction provided by the operation device, on each of the fixed information and the update information whether or not the user service information stored in the first storage part is the newest;

a communication device that acquires, from a second storage part of an information supply server, the newest information corresponding to at least one of the fixed information and the update information which are determined to be not the newest by the determination device;

update means that updates the user service information in the first storage part by use of at least one of the fixed information and the update information which are acquired by the communication device; and a display that displays the user service information updated by the update device and stored in the first storage part, and wherein the information supply server has:

a second storage part that stores user service information including fixed information which is updated at intervals of a predetermined period and update information which is updated at intervals of a period shorter than the predetermined period; and a communication device that transmits, in response to a request from the navigation device, at least one of the fixed information and the update information which are stored in the second storage part.

6. The information service system as claimed in claim 5, wherein the information service device further comprises a location setting device that transmits position information of a location displayed on the display device to the navigation device in response to an instruction of setting a location that is provided by the operation device, wherein the navigation device sets a location on the basis of the position information transmitted by the location setting device and makes a guidance to the set location.

7. The information service system as claimed in claim 5, wherein the information service device includes a separable program capable of being separated from a navigation program of a computer program composing the navigation device and the separable program is updated independently of the navigation program.

* * * * *